Figure 6:
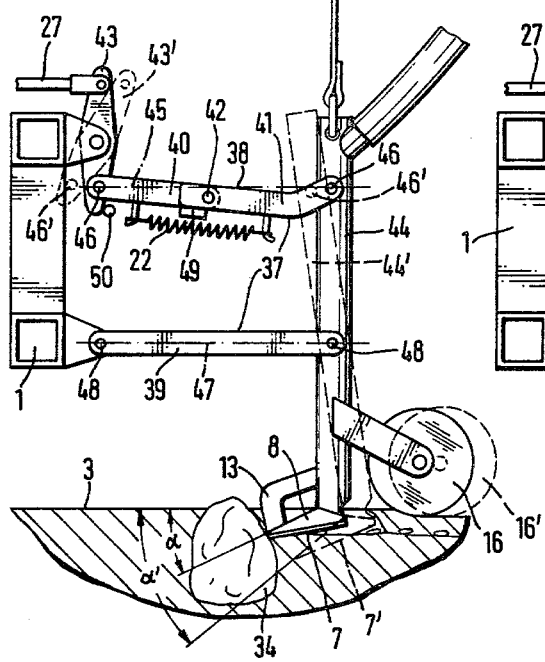

United States Patent [19]

Dreyer et al.

[11] 4,208,974
[45] Jun. 24, 1980

[54] SEED DRILL HAVING PARALLEL GUIDE MEANS FOR THE MOVABLE SHANK

[75] Inventors: Heinz Dreyer, Hasbergen-Gaste; Benno Wiemeyer, Osnabrück, both of Fed. Rep. of Germany

[73] Assignee: Amazonen-Werke, Hasbergen-Gaste, Fed. Rep. of Germany

[21] Appl. No.: 830,380

[22] Filed: Sep. 2, 1977

[30] Foreign Application Priority Data

Sep. 10, 1976 [DE] Fed. Rep. of Germany ....... 2640749

[51] Int. Cl.² ........................... A01C 5/06; A01C 7/20
[52] U.S. Cl. ........................................ 111/85; 111/61; 111/66; 111/86; 172/484; 172/725
[58] Field of Search ............... 172/264, 265, 266, 267, 172/705, 706, 710, 724, 725, 752, 484, 239; 111/85, 86, 81, 66, 68, 59–62, 52, 84

[56] References Cited

U.S. PATENT DOCUMENTS

| 77,924 | 5/1868 | Shreiner | 111/86 |
|---|---|---|---|
| 292,404 | 1/1884 | Bradford | 111/86 |
| 404,853 | 6/1889 | Mast | 111/85 |
| 421,501 | 2/1890 | Johnson | 111/86 X |
| 424,240 | 3/1890 | Wise | 111/61 |
| 652,513 | 6/1900 | Friend | 172/725 X |
| 662,823 | 11/1900 | Rhodes | 111/59 |
| 719,272 | 1/1903 | Steep | 111/86 |
| 939,595 | 9/1909 | Gale et al. | 172/725 X |
| 1,574,917 | 3/1926 | Mitchell | 111/86 |
| 1,993,169 | 3/1935 | Hazard | 111/52 X |
| 2,239,918 | 4/1941 | Kriegbaum | 172/484 X |
| 2,713,836 | 7/1955 | Ajero | 111/85 X |
| 3,177,830 | 4/1965 | Zimmerman | 111/85 |
| 3,797,418 | 3/1974 | Bridger, Jr. | 111/85 X |

FOREIGN PATENT DOCUMENTS

| 268178 | 5/1964 | Australia | 172/265 |
|---|---|---|---|
| 337483 | 6/1921 | Fed. Rep. of Germany | 111/85 |
| 874082 | 7/1949 | Fed. Rep. of Germany | 172/239 |
| 2033380 | 1/1971 | Fed. Rep. of Germany | 111/86 |
| 2605017 | 8/1977 | Fed. Rep. of Germany | 111/85 |
| 1118231 | 6/1956 | France | 172/239 |
| 45220 | 3/1917 | Sweden | 172/705 |
| 56183 | 6/1920 | Sweden | 111/66 |
| 409646 | 7/1932 | United Kingdom | 172/484 |
| 602809 | 6/1948 | United Kingdom | 172/711 |

Primary Examiner—Edgar S. Burr
Assistant Examiner—Steven A. Bratlie
Attorney, Agent, or Firm—Sprung, Felfe, Horn, Lynch & Kramer

[57] ABSTRACT

A seed drill (FIG. 1) having a frame (1) with knife hoes (7) mounted thereon. The knife hoes are movable in a vertical plane and each has two laterally projecting wings (8) bent downwardly toward one another; the outer edges of the wings merge forwardly together to form a point. Each knife hoe has an upright strut (13) supporting the leading point of the knife. Further, each knife hoe is disposed on a shank (9) which is mounted on the frame with parallel guide means (10). The parallel guide means has at least one articulation (19) acting in a vertical plane, a stop (21) limiting forward swinging movement of the knife hoe about the articulation, and at least one resilient element (22) exerting a force on the knife hoe in the direction of the stop. The drill further includes a gauge wheel (16) for each knife hoe to limit the depth of penetration of the knife hoe into the soil.

15 Claims, 9 Drawing Figures

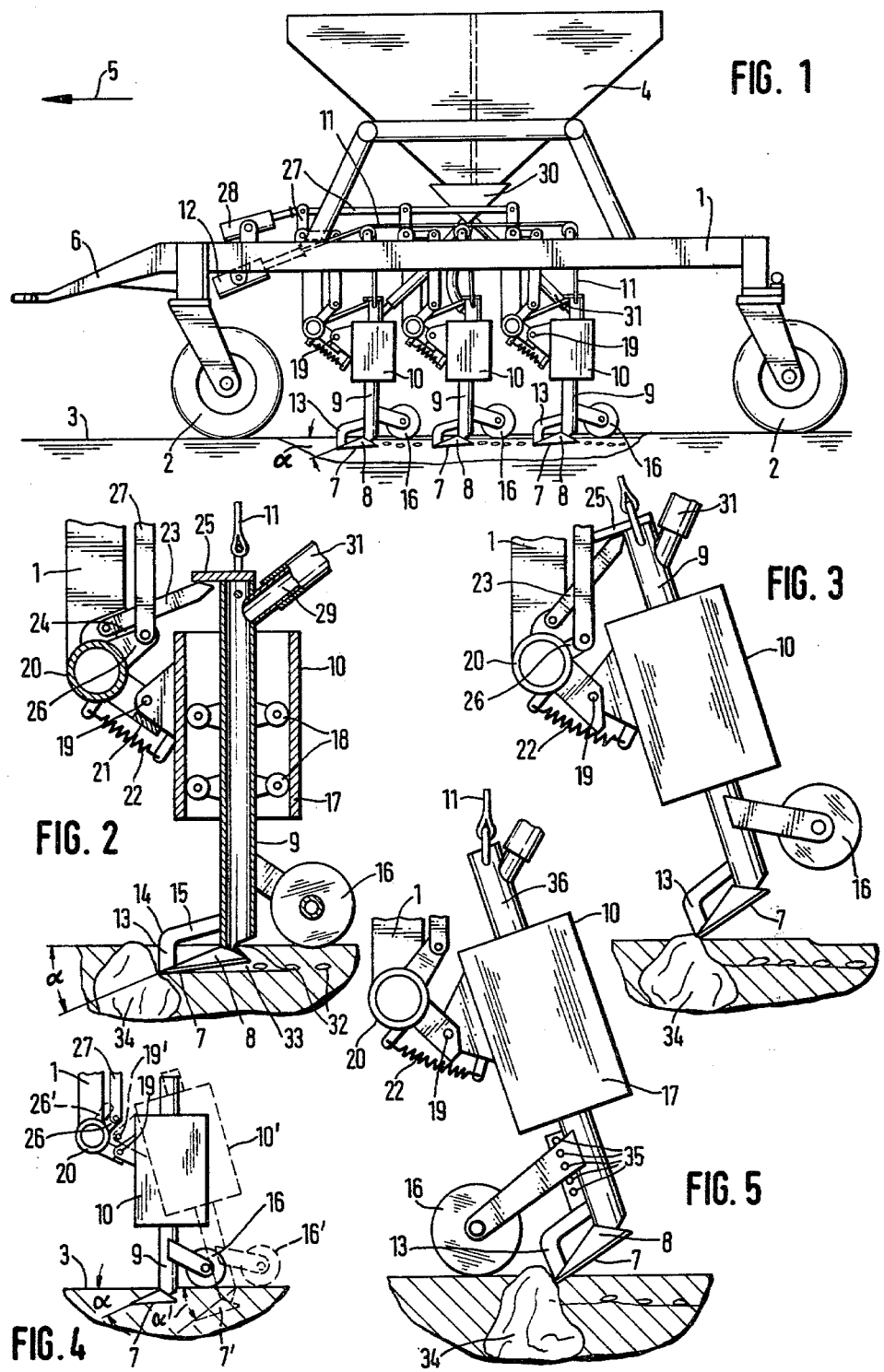

it. The limitation of the forward swinging movement of the hoe by the stop results in a firmly established attitude angle of the wings in relation to the soil, which is furthermore assured by the resilient force exerted on the hoe. If the hoe now encounters an obstruction in the soil, it can swing back, so that damage to the hoe is prevented.

SEED DRILL HAVING PARALLEL GUIDE MEANS FOR THE MOVABLE SHANK

BACKGROUND

The invention concerns a drill which is equipped with a frame and with furrow opening knife hoes which are movable in a vertical plane and disposed on shanks, and which have each two laterally projecting wings bent downwardly in the manner of an inverted V, with their outer edges merging forwardly with one another, and which have in their center an upright strut.

A seed drill of this kind is already disclosed in Swedish Pat. No. 359,721. In this drill, the shanks of the hoes are disposed on the frame for pivoting about horizontal axes in a vertical plane, while each of the upright struts fastened to the hoe shanks and to the openers has an edge extending forwardly and upwardly at an angle from the tip of the knife hoe. By means of this cutting edge, the knife hoes engaging the ground in operation are lifted if they collide with an obstruction in the soil, thereby preventing damage to these hoes and their shanks. It is furthermore advantageous that the seeds are placed in the soil in a broader swath by each knife hoe, resulting a greater stability of the individual plants in the soil after germination of the seed, and this can result in greater yields. It is a considerable disadvantage in this drill, however, that the depth of penetration of the knife hoes into the soil cannot be maintained constant. This deficiency is to be attributed to the fact that the attitude angle of the wings of the hoes varies upon the slightest rocking movement of the shanks. On this account, the knife hoes perform upward and downward movements in the soil, even in the case of small differences in the consistency of the soil which are always present in practice. Differences in the depth at which the seeds are deposited in the soil, however, result in different germination times for the individual seeds, which can contribute to smaller yields. These differences of depth of penetration of the knife hoes into the soil are further increased by the fact that the hoes penetrate considerably deeper into looser soils than they do into denser soils.

Furthermore, another important disadvantage of this drill is that it can be used only on fields well prepared for seeding. However, it has been found advantageous in agricultural practice, for the maintenance of the capillarity of the soil, biological equilibrium and the natural formation of humus associated therewith, and with regard to the saving of labor, to plant the seeds in the soil without preparatory plowing, i.e., without turning over the upper layers of the soil. Now, if, in the practice of this method of "no-till" cultivation of the soil with the known machine, the attitude angle of the wings of the knife hoes is made great enough to assure the entry of the hoes into unprepared soils, the hoes, after penetrating the surface of the ground covered with stubble and vegetation, will penetrate so deeply into the soil that on lighter soils the seeds can easily become buried too deep. On heavier soils, however, in which the furrows produced by the hoes will not close up again even partially by themselves behind the hoes, wide furrows will be formed, which also will fail to be smoothed over by the press wheels installed behind the hoes on the known drill, so that most of the seeds will lie uncovered on the soil. This will then produce the danger of the waterlogging or the desiccation of the soil, depending on weather conditions, which in turn can cause great losses of germination and hence crop losses.

If, however, the attitude angle of the hoe wings is so low that the above-named difficulties are largely overcome, the hoes will ride on top of the surface layer of vegetation and stubble without penetrating into the soil. The seeds will thus be deposited on the surface rather than in the soil, resulting again in the same losses of germination and crop losses. The forwardly slanting front edge of the upright struts on the hoes produces a disadvantageous effect to the extent that pieces of vegetation and stubble gather under it and additionally impair the penetration of the hoes into the soil.

A drill is furthermore disclosed by British Pat. No. 873,737, which is equipped with conventional furrow openers which are carried each by a parallel guiding means on the frame of the machine. This results in the advantage that the attitude angle of the openers with respect to the soil is maintained at all depths of penetration. Furthermore, to keep the depth of penetration constant, a runner is disposed on each furrow opener.

It is disadvantageous in this drill that the seeds are deposited in only narrow furrows in the soil, resulting in lower yields than in the swath planting method. Furthermore, this drill can be used only on fields that are well prepared for seeding, i.e., plowed and harrowed, because conventional furrow openers are not capable of penetrating unworked soils covered with vegetation and stubble. Also, the runners additionally prevent the penetration of the openers into the soil, because the vegetation and stubble gather under them so that the furrow openers ride above the surface of the soil.

THE INVENTION

The invention is addressed to the problem of improving the known drill while retaining the advantage of the prevention of damage to the knife hoes and their holders when they encounter obstructions in the soil, in such a manner that, even in operations on soils unprepared for seeding, a more rapid penetration of the hoes into the soil will be achieved and the depth of penetration will be maintained constant.

This problem is solved in accordance with the invention in that each knife hoe is mounted on a parallel guiding means in a manner known in conventional furrow openers, and that this parallel guiding means has at least one articulation acting in a vertical plane, a stop limiting the forward swinging movement of the hoe about this articulation, and it has at least one resilient element exerting a force on the hoe in the direction of the stop, and that a press or gauge wheel is provided for each hoe to limit its depth of penetration into the soil. As a result of these measures, the attitude angle of the wings can be adjusted in advance such that, on the one hand the layer of vegetation and stubble on the surface of the ground will be securely penetrated by them, and that thus, on the other hand, the layer of soil lifted by the hoes will pass over the wings and, behind them, cover the seed furrows formed by the hoes. Thus a uniform maintenance of the depth of the hoes is achieved in cooperation with the press wheels.

Since, as a result of the parallel guiding means, the attitude angle of the wings with respect to the soil always remains constant, a somewhat deeper penetration of the hoes into lighter soils less resistant to pressure is achieved than on hard, resistant soils. This automatic regulation leads to the advantage that the seeds are brought into more reliable contact with the moisture in the soil under all soil conditions, thereby achieving a more rapid and uniform germination of the seed.

Now, if the knife hoe opener strikes against a rock or other obstruction present in the soil, the lower part of the parallel guiding means will swing rearwardly about the articulation, causing the hoe connected to it not only to yield resiliently rearward, but also, in cooperation with the upright strut, to move upward on the obstruction until it can pass over the said obstruction. After passing the obstruction, the hoe is moved back into its initial position by the resilient element.

If an abutment is provided on the articulation for the resilient element, the resilient element can pass tightly around the articulation without change in the direction of its action on the hoe when the parallel guiding means moves about the articulation.

In a preferred embodiment, the invention provides that the parallel guide means have, in a known manner, linkages disposed in two series one over the other and pivotingly joined to the frame on the one hand and to the hoe shanks on the other, in a known manner, in which the imaginary straight lines connecting the pivot axes of the upper and lower linkages are at least approximately parallel to one another, and that at least the linkages that are in one series consist of two linkage members joined together by the articulation, the axis of the articulation being situated outside of the straight line connecting the two pivot axes of these links. This construction is characterized by an especially simple and reliable operation. If in this case an additional stop is provided for each parallel guiding means, to be engaged by the forward links upon the pivoting movement of the knife hoe, an additional upward movement of the hoe is achieved in the rearward pivoting movement of the hoe, so that, upon striking an obstruction, it can move more rapidly in the upward direction and pass over this obstruction. Furthermore, if the imaginary straight lines between the pivot axes of the upper and lower linkages are at least approximately horizontal when the knife hoes are in the soil, any additional upward or downward force component will be prevented from acting upon the hoes independently of the attitude angle of their wings when the density of the soil and hence its resistance, increases.

Furthermore, provision is made in accordance with the invention that the forward edge of each strut extends virtually vertically upward from the forward end of the knife hoe. This brings it about that, in the rearward movement of the hoe, provoked by an obstruction, the hoe is able to ride upward on the obstruction until it is free from it. Also, trash is prevented from gathering on the front of the hoe as it does in the case of an upward and forwardly slanting edge, causing it to be lifted out of the soil or impairing its operation. Because of the fact that the forward edge of each strut has a bend at a distance of no more than 15 cm above the forward end of the knife hoe and then extends rearwardly at a low upward angle to the hoe shank, to which it is fastened, the deflection of trash from the hoe is still further improved.

If gauge wheels are situated ahead of the hoes when a rearward movement of the hoes is caused by an obstruction, an additional upward movement of the hoes is also produced. This measure furthermore contributes to the safety of the knife hoes by the fact that, in the case of large obstructions projecting above the soil, the hoes will be raised upward by the gauge wheels even before they contact the obstruction.

In an advantageous embodiment, each knife hoe is disposed for angular adjustment through the parallel guide means. By these measures a separate depth adjustment for the hoes is eliminated. This is to be attributed to the fact that, for example, in the case of an enlargement of the attitude angle of the wings, which is produced by an adjustment of the angle of the parallel guide means, a greater depth of penetration of the knife hoe into the soil is automatically produced. On the other hand, the attitude angle of the wings can be greater in the case of knife hoes penetrating deeper into the soil, without creating the danger that the earth will be laid aside by the wings instead of passing above them.

If all of the parallel guide means in this case are connected to an adjusting means, the requirements are fulfilled for a convenient and rapid adjustment of the optimum angle of attack of the wings and of the depth of penetration of all knife hoes, from a central location.

Figure 7:
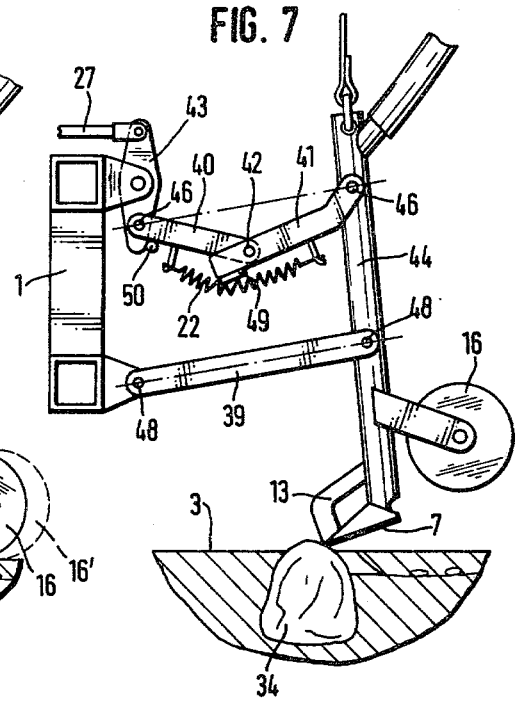
Figure 8:
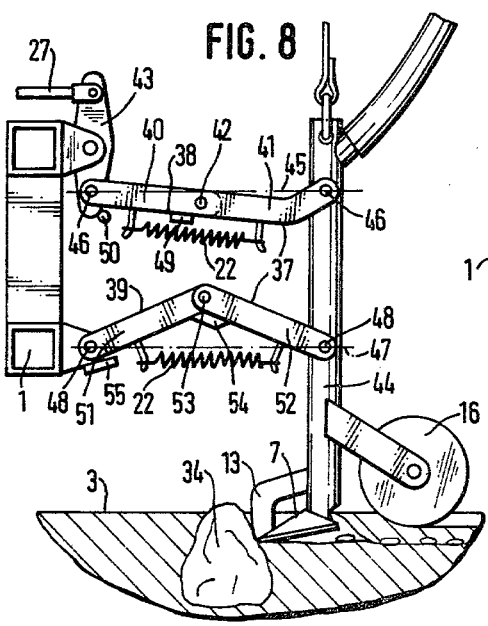
Figure 9:
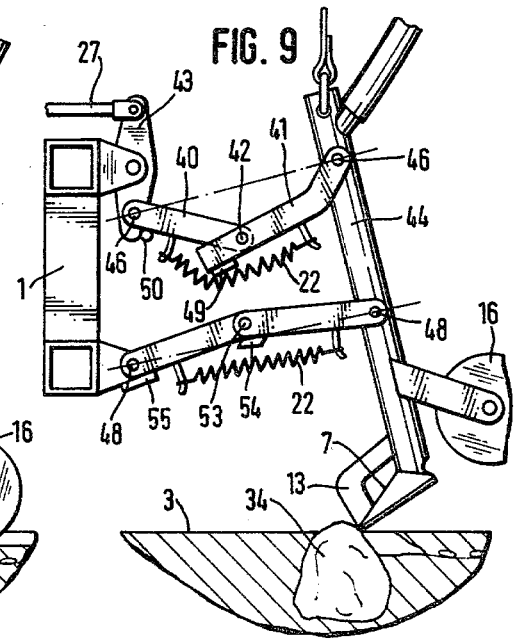

The invention will be further explained hereinafter with the aid of the embodiments represented in the drawing appended hereto, wherein FIG. 1 represents a side elevational view of a drill in accordance with the invention, FIG. 2 represents an enlarged longitudinal cross section of the parallel guiding means of a knife hoe in the working position thereof on the frame of the same machine, FIG. 3 represents a side elevational view of the same parallel guiding means passing over an obstruction, FIG. 4 is a reduced diagrammatic side elevational view of the same parallel guide means, showing a change of the attitude angle of the knife hoe, FIG. 5 is also a side elevational view of a similar parallel guide means having a gauge wheel disposed ahead of the knife hoe which is in the tilted state, FIG. 6 is a side elevational view of another parallel guide means with the knife hoe in the working position, FIG. 7 is a side elevational view of the parallel guide means of FIG. 6 in the tilted state, FIG. 8 is a side elevational view of another parallel guide means with the knife hoe in the working position, and FIG. 9 is also a side elevational view of the parallel guide means of FIG. 8 in the tilted state.

The drill has a frame 1 which is supported on the ground surface 3 by the three running wheels 2 which are in the form of swivel wheels, the said frame carrying the hopper 4 which is divided into two parts for the accommodation of two different types of material, such as fertilizer and seeds, for example. Of these running wheels, the rear wheel can be locked either in the working direction indicated by the arrow 5 or in a transport direction transverse thereto. At the forward part of frame 1 is situated the draw bar 6 for hitching the seed drill to a tractor which is not shown.

Furthermore, the seed drill is equipped with the knife hoes 7 which are arranged in three rows and staggered from one another in the working direction 5. Each of these knife hoes 7 has, in a known manner, two wings blades 8 which are bent downwardly and form the acute attitude angle α with respect to the ground surface 3 when in the working position as shown. The knife hoes 7 are fastened to the shanks 9 which can be raised and lowered in the parallel guide means 10 and are connected by the ropes 11 to the hydraulic cylinder 12 so that they can be raised to the transport position or lowered to the working position. The knife hoes 7 are furthermore equipped at the center of their blades 8 with the upright strut 13 whose leading edge extends virtually vertically upwardly and which is bent at 14 and slants slightly upwardly in portion 15 which is welded to the hoe shank 9. The strut supports the leading point of the knife hoes. A press wheel or gauge wheel 16 is disposed on each hoe shank 9 rearwardly of the hoes 7.

As best seen in FIG. 2, each parallel guide means 10 has a guide 17 of tubular construction, in which the knife hoe shank 9 can easily be moved up and down with the aid of the rollers 18 mounted on it. Each guide 17 is disposed for pivoting at an articulation 19 on a sleeve 20 rotatably mounted on the frame 1, the articulation 19 being provided with a stop 21 to limit the forward pivoting movement of the lower part of the guide 17. The resilient element 22 attached at one end to the guide 17 and at the other end to the sleeve 20 holds the guide 17 against the stop 21.

On the top of the sleeve 20 the lifter arm 23 is pivotally mounted, its downward movement being limited by the stop 24. This lifter arm 23 engages with its free end the bottom of a projection 25 disposed on the upper portion of the hoe shank 9 which projects from the guide 17. On each sleeve 20 there is welded a lever 26, the levers 26 of all sleeves 20 being connected by the linkage 27 to the hydraulic cylinder 28 serving as an adjusting means. Lastly, the shanks 9 are of tubular construction and each is equipped at its upper portion projecting from the guides 17 with a nipple 29 to which are attached the tubes 31 connected to the metering mechanism 30 of the hopper 4, so that the seeds and grains of material 32 can fall through the hoe shank 9 and be deposited in swaths in the broad furrows 33 cut by the knife hoes 7.

If, as represented in FIG. 2, the tip of the knife hoe 7, which is braced by the strut 13, strikes against a rock 34 or other obstruction in the soil, the lower portion of the parallel guide means 10 will swing rearwardly about the articulation 19 relative to the frame 1 of the seed drill, against the force of the resilient element 22, the stop 21 serving as an abutment for the resilient element 22. In this swinging movement, the lifter arm 23 strikes against the upper part of the shank 9 and, as a result of its simultaneous engagement with the projection 25, forces the shank 9 upward in the guide means 10, so that the hoe 7 slides upwardly on the rock 34 on the leading edge of its strut 13, until it can pass over the rock and be swung forwardly again by the resilient element 22 through the parallel guide means 10, and can thus penetrate again into the soil.

As shown by FIG. 4 in conjection with FIG. 1, by the action of the adjusting means consisting of the hydraulic cylinder 28, the sleeves 20 can be turned through the linkage 27, whereupon the attitude angle α of the wings 8 of the knife hoes 7 in relation to the ground surface 3 changes. If, for example, the lever 26 of each sleeve 20 is swung upward to the position 26', articulation 19 also swings with the sleeve 20 by the same angular amount to the position 19', and the parallel guide means 10 swings to the position 10'. Thus the attitude angle α of the hoe wings 8 increases to the attitude angle α'. Since the hoe shanks 9 are disposed for movement upward and downward in the parallel guide means 10, the press wheels 16 remain on the surface 3 of the ground and assume the position 16', while the hoes 7 are given the position 7' in which they penetrate deeper into the soil.

In the embodiment represented in FIG. 5, a gauge wheel 16 is mounted ahead of the knife hoe 7. If in this embodiment the parallel guide means 10 is swung about the articulation 19 when the knife hoe 7 strikes against the rock 34, an upward movement of the hoe shank 36 in guide 17 simultaneously takes place, so that the front edge of its upright strut 13 rides upward on the rock 34. In this arrangement, therefore, the lifter arm 23 with stop 24 and projection 25 are eliminated. In this embodiment the gauge wheel 16 is mounted on the hoe shank 36 so as to be adjustable for height by means of the holes 35, so that, in the case of the larger attack angle α' for the cutting blades 8, a greater depth of penetration of the knife hoe can be established.

FIGS. 6 and 7 represent a parallel guide means 37 for a knife hoe 7 which consists of the two upper linkages 38, which are congruent with one another, and the two lower linkages 39 which are also congruent with one another. Here the two upper linkages 38 consist each of two linkage members 40 and 41 joined together by the articulation 42, of which the forward linkage members 40 are articulated to the lever 43 and the two rear linkage members 41 are disposed on the hoe shank 44. On the other hand, the two lower linkages 39 are each of a one-piece construction and are articulated at one end to the frame 1 and at the other end to the hoe shank 44. This arrangement is such that the imaginary straight line 45 connecting the pivot axes 46 of the upper linkages 38 is parallel to the imaginary straight line 47 connecting the pivot axes 48 of the two lower linkages 39, and when the knife hoe 7 is in the soil the two lines 45 and 47 assume an approximately horizontal position.

The lever 43 is also articulated to the frame 1, its upper part being connected to the linkage 27. If the lever 43 is now swung into the position 43', the pivot axes 46 will assume the position 46', and the hoe shank 44 will assume the position 44', the press wheel 16 rolling backward on the ground surface 3 to the position 16' and the hoe 7 assuming the position 7'. Thus the attitude angle α of the wings 8 of the furrow opener 7 becomes the attitude angle α' and at the same time the depth of penetration of the knife hoe 7 into the soil is increased.

Furthermore, the rear linkage members 41 are equipped with the abutment 49 against which the forward linkage members 40 are held by means of the resilient element 22. Also, the stop 50 is situated on lever 43 at a short interval below the forward linkage member 40. This short interval is necessary to enable the hoe 7 to be held by the press rolls 16 at a uniform distance from the ground surface in the case of unevenness of the ground.

Now, if the tip of the knife hoe 7, reinforced by the strut 13, strikes against a rock 34, the two forward linkage members 40 will be folded against the two rear linkage members 41 against the force of the resilient element 22; the articulation 42 will thus move downwardly, and the distance between the two upper articulation axes 46 will be shortened. In this case the stop 49 again serves as an abutment for the resilient element 22. Since the forward linkage members 40 encounter the stop 50 after a short travel, the hoe 44 is not only inclined forwardly, but is also lifted upwardly, so that the hoe 7 slides upwardly over the rock 34 on the forward edge of its strut 13 until it passes beyond the rock. Then the resilient element 22 pulls the hoe 7 back to its initial position in the soil.

The embodiment represented in FIGS. 8 and 9 differs from the one in FIGS. 6 and 7 only in that the lower linkages 39 also consist of two linkage members 51 and 52 connected together by the articulation 53. Below the articulation 53 there is a stop 54 on the rear linkage members 52, against which the forward linkage members 51 are drawn by means of the resilient element 22. The stop 54 establishes a minimum distance between the pivot axes 48 of the lower linkages 39, while stop 49 establishes a maximum distance between the pivot axes 46 of the upper linkages 38.

If in this embodiment the hoe 7, reinforced by the strut 13, collides with the stone 34 in the soil, the articulations 42 and 53 will move downwardly against the force of the resilient elements 22, so that the distance between the upper pivot axes will be diminished, while the distance between the lower pivot axes 47 will be increased. Thus the hoe 44 is given a more greatly inclined position than in the case of the embodiment shown in FIGS. 6 and 7. Since, again, the forward linkage members 40 are held by stop 50 after a short excursion, the hoe shank 44 is simultaneously moved upwardly, so that the hoe 7 can ride still more easily over the rock 34.

Of course, it is possible to achieve the same effect as in the case of the embodiment represented in FIGS. 6 and 7 by dividing only the lower linkages 39 into two linkage members 51 and 52 joined together by the articulation 53, in which case a stop 55 is provided at a short distance below the forward pivot axis 48.

In the embodiment of FIGS. 1-4 and 6-9, the wheel 16 is a press (see e.g. FIG. 8) and gauge (depth penetration) wheel; in the embodiment of FIG. 5, wheel 16 is a gauge wheel.

What is claimed is:

1. A seed drill having a frame with knife hoes mounted thereon, the knife hoes being movable in a vertical plane and each having two laterally projecting wings bent downwardly toward one another, the outer edge of the wings merging forwardly together, each knife hoe having an upright strut supporting the leading point thereof, each knife hoe being disposed on a shank which is mounted on the frame with parallel guide means, means for adjusting the angle of the shanks with respect to the horizontal, with the shanks in the normal working position, the forward edge of each strut extending virtually vertically upward from the forward end of its knife hoe and, at a distance of less than about 15 cm above the forward end of its knife hoe, passing through a bend into a slightly rising portion which extends to and is fastened to the shank, the parallel guide means having at least one articulation acting in a vertical plane, a stop limiting forward swinging movement of the knife hoe about the articulation, and at least one resilient element exerting a force on the knife hoe in the direction of the stop, and a gauge wheel for each knife hoe to limit the depth of penetration of the knife hoe into the soil, the gauge wheels being disposed to the rear of the knife hoes, each parallel guide means having two linkages situated one above the other, each being pivotingly joined to the frame at one end thereof, and to the shank at the other end thereof, straight connecting lines between the pivot axes of the upper and lower linkages being disposed about parallel to one another, at least one of the linkages comprising two linkage members joined together by said articulation, the axis of said articulation in the normal working position being disposed aside the straight connecting line.

2. Seed drill of claim 1, wherein an abutment is provided for the resilient element.

3. Seed drill of claim 2, wherein the stop serves as the abutment.

4. Seed drill of claim 1, wherein each of said two linkages comprises two linkage members joined together by an articulation, the axis of which in the normal working position is disposed aside the straight connecting line between the two pivot axes of the linkage, the two pivot axes of the upper linkage having their maximum distance apart determined by a stop and the two pivot axes of the lower linkage having their minimum distance apart determined by a stop.

5. Seed drill of claim 1, wherein each parallel guide means has at least one additional stop for engagement with a linkage in rearward swinging movement of the knife hoe.

6. Seed drill of claim 1, the adjusting means for said shanks comprising a control unit interconnected with all of said shanks for simultaneously adjusting the angle of said shanks with respect to the horizontal.

7. A seed drill having a frame with knife hoes mounted thereon, the knife hoes being movable in a vertical plane and each having two laterally projecting wings bent downwardly toward one another, the outer edges of the wings merging forwardly together, each knife hoe having an upright strut supporting the leading point thereof, each knife hoe being disposed on a shank which is mounted on the frame with parallel guide means, the parallel guide means having at least one articulation acting in a vertical plane, a stop limiting forward swinging movement of the knife hoe about the articulation, and at least one resilient element exerting a force on the knife hoe in the direction of the stop, and a gauge wheel for each knife hoe to limit the depth of penetration of the knife hoe into the soil, each parallel guide means having a straight upright guide in which its knife hoe is disposed for movement upward and downward, and the upright guide being fastened pivotally at the articulation, each shank projecting upwardly beyond the upright guide, a projection on a portion of the shank which is disposed above the upright guide, a lifter arm disposed pivotally on the frame above the articulation for engaging the projection on the shank and lifting the shank in the guide means when the knife hoe swings rearwardly.

8. Seed drill of claim 7, wherein the upright guides are tubular, and the shanks on which the knife hoes are disposed are movable upward and downward in the upright guides.

9. Seed drill of claim 7, wherein an abutment is provided for the resilient element.

10. Seed drill of claim 9, wherein the stop serves as the abutment.

11. Seed drill of claim 7, wherein the forward edge of each strut extends virtually vertically upward from the forward end of its knife hoe.

12. Seed drill of claim 11, wherein the forward edge of each strut, at a distance of less than about 15 cm above the forward end of its knife hoe passes through a bend into a slightly rising portion which extends to and is fastened to the shank.

13. Seed drill of claim 7, the gauge wheels being disposed to the rear of the knife hoes.

14. Seed drill of claim 7, wherein the gauge wheels are disposed ahead of the knife hoes.

15. Seed drill of claim 14, and means for adjusting the height of the gauge wheels and the knife hoes with respect to one another.

* * * * *

UNITED STATES PATENT AND TRADEMARK OFFICE
CERTIFICATE OF CORRECTION

PATENT NO. : 4,208,974
DATED : June 24, 1980
INVENTOR(S) : Heinz Dreyer et al.

It is certified that error appears in the above—identified patent and that said Letters Patent is hereby corrected as shown below:

Column 7, line 38, (claim 1, line 5) change "edge" to

-- edges --.

Signed and Sealed this

Eighth Day of December 1981

[SEAL]

Attest:

Attesting Officer

GERALD J. MOSSINGHOFF

Commissioner of Patents and Trademarks